United States Patent [19]

Doemen

[11] Patent Number: 4,626,751
[45] Date of Patent: Dec. 2, 1986

[54] DIRECT-CURRENT MOTOR WITHOUT COMMUTATOR

[75] Inventor: Benno Doemen, St. Georgen, Fed. Rep. of Germany

[73] Assignee: Papst-Motoren GmbH & Co KG, St. Georgen, Fed. Rep. of Germany

[21] Appl. No.: 748,010

[22] Filed: Jun. 24, 1985

Related U.S. Application Data

[63] Continuation of Ser. No. 499,670, Jun. 1, 1983, Pat. No. 4,542,323, which is a continuation of Ser. No. 287,061, Jul. 27, 1981, abandoned, which is a continuation of Ser. No. 40,276, May 18, 1979, abandoned.

[51] Int. Cl.$^4$ .......................................... H02K 29/00
[52] U.S. Cl. .................................... 318/254; 318/138
[58] Field of Search ............... 318/254, 138, 314, 341, 318/345, 346, 356, 439, 503, 505, 506, 518, 532, 536

[56] References Cited

U.S. PATENT DOCUMENTS

| | | | |
|---|---|---|---|
| 3,383,574 | 5/1968 | Manteuffel | 318/138 |
| 3,719,870 | 3/1973 | Bregeault | 318/138 |
| 3,873,897 | 3/1975 | Muller | 318/138 |
| 3,898,544 | 8/1975 | Tanikoshi | 318/254 |
| 4,134,030 | 1/1979 | Pace | 318/254 A |
| 4,449,081 | 5/1984 | Doemen | 318/254 |

FOREIGN PATENT DOCUMENTS

| | | | |
|---|---|---|---|
| 2452082 | 6/1976 | Fed. Rep. of Germany | 318/138 |
| 2804561 | 8/1979 | Fed. Rep. of Germany | 318/138 |

OTHER PUBLICATIONS

Motorola, "Silicon Zener Diode and Rectifier Handbook" 1964, pp. 23–26.

*Primary Examiner*—B. Dobeck
*Attorney, Agent, or Firm*—Theodore J. Koss, Jr.

[57] ABSTRACT

When the motor's permanent-magnet rotor is in a first range of angular positions a stator-winding phase is energized to have a first magnetic polarity, and to have an opposite second polarity when the rotor is in a second range of angular positions. The rotor angular position is sensed by a magnetic-field-sensitive semiconductor element, especially a Hall generator, responsive to the field from the permanent-magnet rotor. When the rotor is in a range of angular positions between such first and second ranges, all power transistors are rendered non-conductive, by control signals derived from the magnetic-field-sensitive semiconductor element by intermediate circuitry, to render the stator-winding phase currentless during the time interval within which commutation is to occur. The intermediate circuitry introduces threshold value(s), to determine from the rotor-position signal when the rotor is in such intermediate range, and may furthermore amplify the rotor-position signals and/or apply temperature compensation to highly-temperature-dependent rotor-position signals. The motor is a one-phase collectorless d.c. motor. The intermediate circuitry can also be used to furnish such temperature conpensation in the case of plural-phase collectorless d.c. motors.

18 Claims, 8 Drawing Figures

DIRECT-CURRENT MOTOR WITHOUT COMMUTATOR

This is a continuation of application Ser. No. 499,670 filed June 1, 1983, now U.S. Pat. No. 4,542,323, which in turn was a continuation of application Ser. No. 287,061 filed July 27, 1981, now abandoned which in turn was a continuation of application Ser. No. 040,276 filed May 18, 1979, now abandoned.

BACKGROUND OF THE INVENTION

This invention relates to collectorless direct-current motors, with a rotor, a detector for the rotor position, a motor winding arrangement which is supplied with current via a bridge circuit controlled by semiconductor switches acting dependent upon the rotor's angular position, and furthermore having a device for reducing the current in the bridge circuit during the time interval within which commutation of the motor winding arrangement is to occur.

Such motors are known from the German Pat. No. 1208 803 and from the published German allowed patent application ("Auslegeschrift") No. 25 085 46. To avoid, with the known motors short circuits during the stator current commutation, which would bring about an impermissible loading of the semiconductor switches and the source of the direct voltage, the bridge circuit of such motor is provided with a semiconductor switch connected in series with the bridge circuit (German "Auslegeschrift" 25 085 46), or else is provided with two such series-connected semiconductor switches (German Pat. No. 1208 803), these operating to block the current flow through the bridge circuit each time that commutation is to occur. This known device is effective and prevents short circuits and the resulting damage. It is, however, expensive since, in addition to the required, associated control devices, further heavy-duty, and thus expensive, semiconductor switches are required to block the total current to the bridge circuit.

SUMMARY OF THE INVENTION

It is therefore one object of the invention, to develop a collectorless direct-current motor such that, on the one hand blocking of the bridge circuit's current during commutation is ensured and, on the other hand, that the design of the control circuit be kept comparatively inexpensive, even in applications requiring operation at higher power outputs. Additional semiconductor switches dimensioned to block the total current to the bridge circuit should, in particular, be avoided. Furthermore, the commutating signals should be prepared in an advantageous manner.

This object is achieved with the invention, by arranging a control stage between the rotor-position detector and the semiconductor switches of the bridge circuit. During each time interval within which commutation is to occur, the output signals that the rotor-position detector produces during this time interval are converted by such control stage into blocking signals for the bridge circuit's semiconductor switches, and these blocking signals are applied to all of the said switches.

Since, with the inventive circuit configuration, the semiconductor switches of the bridge circuit are themselves rendered non-conductive during the time interval within which commutation of the motor winding is to occur, the desired interruption of current during such time interval can be achieved without the need for additional power transistors or similar heavy-duty semiconductor switches. Since the semiconductor switches already present in the bridge circuit are utilized to implement the desired current interruption, one can instead make do with the addition of mere control or drive transistors of low-power and thus inexpensive type.

The inventive circuit configuration is particularly suitable for simply designed collectorless direct-current motors, of the type disclosed in detail in published German patent application ("Offenlegungsschrift") No. 22 25 442, but is also suitable for other such motor types.

The motor advantageously has a permanent-magnet rotor. The invention is of particular advantage when the motor is a single- or double-pulse one-phase motor. As well known the stator winding of a one-phase collectorless d.c. motor generates a merely alternating stator field (and cannot produce a rotating stator field). Accordingly, as likewise well known, in one-phase collectorless d.c. motors, at certain ranges of rotor angular position the stator winding is incapable of exerting electrodynamic torque upon the rotor, these "dead" ranges of rotor angular position often being called torque gaps. To ensure that driving torque continues to be applied to the rotor when the latter is located in or passing through one of these dead zones, the motor is designed to provide a reluctance torque which acts upon the rotor in a sense turning the latter in the desired rotary direction, at least when the rotor is located within one of these dead zones or torque gaps. As known, such a reluctance torque can be achieved by suitably designing the stator.

The stator may have only one single coil, wound in a single direction. The invention is, however, also suitable for motors with two or more coils such as known for example from German Pat. No. 12 08 803, or from the earlier-mentioned published German patent application No. 25 08 546.

Additional details and further advantages of the invention will be evident from the following description of preferred embodiments when read in conjunction with the drawings.

DESCRIPTION OF THE PREFERRED EMBODIMENTS

Figure 1:
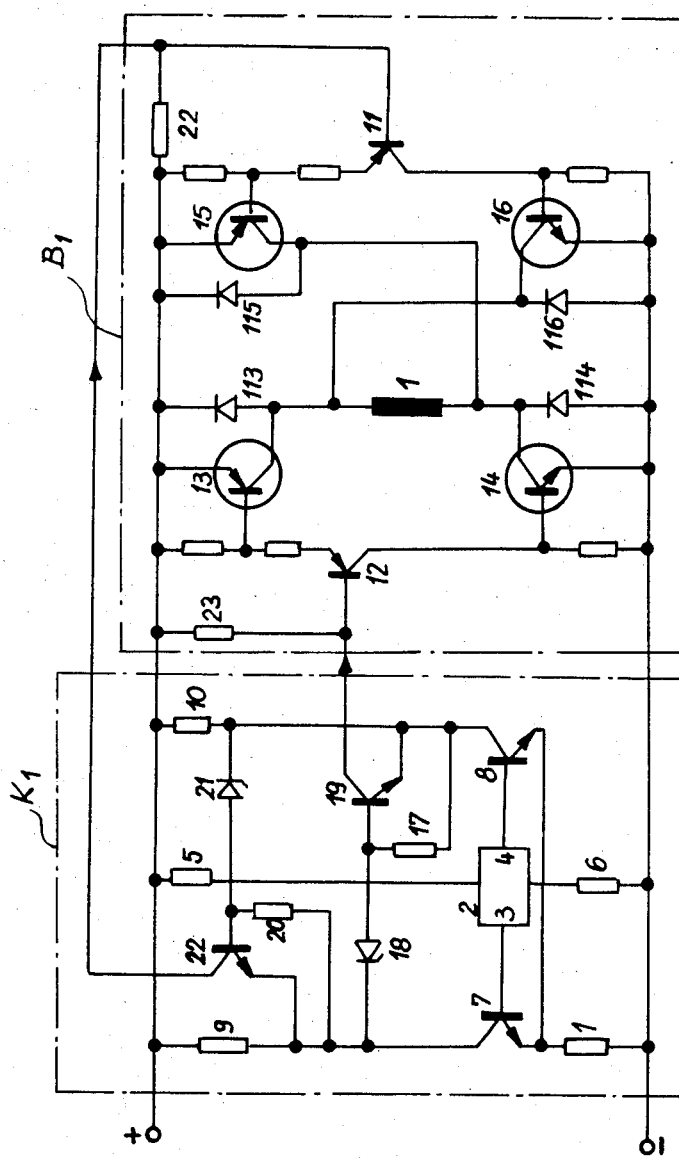
FIG. 1 depicts a commutation circuit with a full semiconductor bridge and with Zener diodes in the preamplifier stage for composing the control signals for the drive transistors.

FIG. 1 depicts the commutation circuitry for a collectorless direct current motor having a permanently magnetic two-pole rotor, and a one-phase stator winding 1 in which a merely alternating field is generated. A Hall generator 2 is arranged in series with resistors 5, 6 while the Hall generator outputs 3, 4 are directly connected to the bases of the transistors 7, 8 of a differential amplifier. Signal changes resulting from changes of rotor position during rotor rotation, will lead to changes in the currents flowing through the transistors 7, 8, and thus to alternating voltages at the resistors 9, 10. These voltages are not used directly for the control of the drive transistors 11, 12 and the power transistor pairs 13, 14 and 15, 16 since, in the case of the full bridge configuration of FIG. 1, a sufficiently long time interval must be provided between the switching-OFF of one power transistor pair and the switching-ON of the other power transistor pair in order to prevent one of the power transistor pairs from being rendered conductive while the other power transistor pair is itself still conductive. This desired time-offset between the switching-OFF of the one transistor pair 13, 14 and the switching-ON of the other transistor pair 15, 16 (or vice versa) is achieved, as the case may be, either by the group of components 17, 18, 19 or else by the group of components 20, 21, 22. Each such group consists of a respective resistor 17 or 20, a respective Zener diode 18 or 21, and a respective transistor 19 or 22. The drive transistors 11, 12 become non-conductive whenever the potential difference at the associated resistor 9 or 10 drops below the Zener voltage of the associated Zener diode 18 or 21. Such potential difference must reach at least the value of the Zener voltage in order, via transistor 19 or 22, to render conductive the associated drive transistor 11 or 12 and the associated power transistor pair 13, 14 or 15, 16.

To protect the transistors 13, 14, 15, 16 against voltage surges that can occur when the power transistors are rendered non-conductive, namely voltage surges caused by transformation into electric energy of the magnetic energy stored in the stator winding 1, diodes 113, 114, 115, 116 are provided, each connected between the collector and emitter of a respective one of the power transistors 13, 14, 15, 16.

Figure 2:
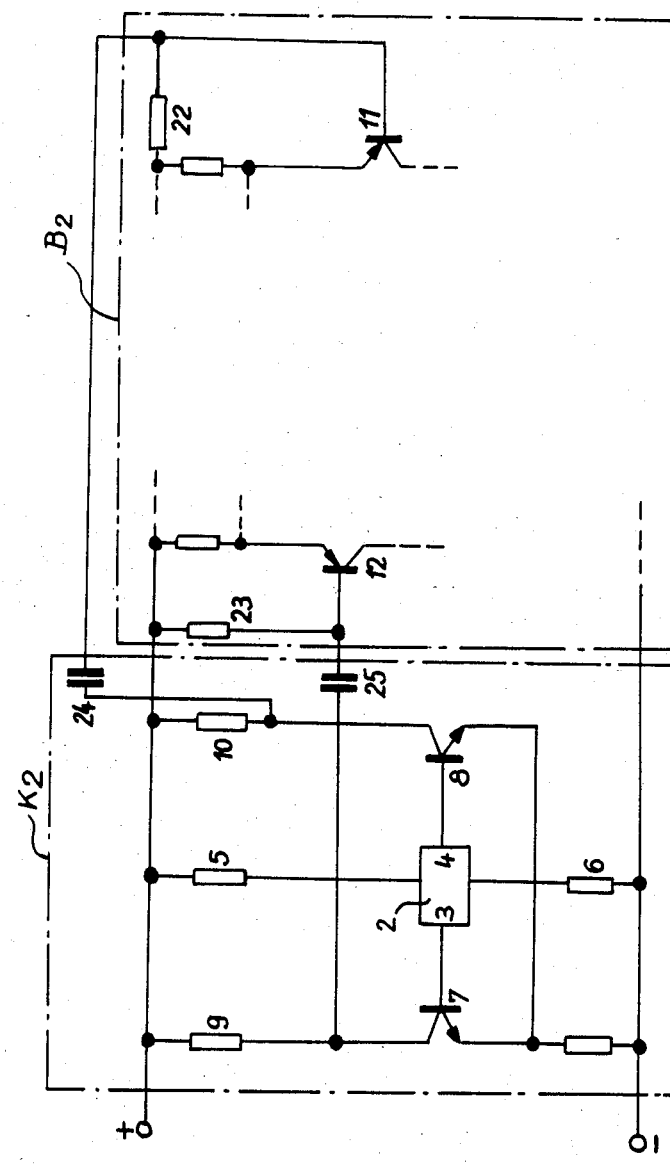
FIG. 2 depicts a commutation circuit with drive transistors connected via capacitors.

In FIG. 2, the required time offset between the switching-OFF of transistor pair 13, 14 and the switching-ON of the power transistor pair 15, 16 (or vice versa) is implemented via the drive voltage of the drive transistors 11, 12. As the rotor position changes during rotor rotation the corresponding voltage changes at the outputs 3, 4 of Hall generator 2 cause each difference-amplifier transistor 7, 8 to be alternately rendered conductive and non-conductive, in phase opposition to each other. Conduction by transistor 8 will cause an increased voltage drop across the resistor 10, and thereby a flow of current via capacitor 24 and resistor 23 which renders conductive the drive transistor 11 and the power transistor pair 15, 16 associated therewith. Charging of the capacitor 24 ensuing during this time will bring about an advanced switching-OFF of the drive transistor 11 and associated power transistor pair 15, 16, right after the next-occurring drop in the Hall voltage at the output 4 of the Hall generator 2. This will occur before the other difference-amplifier transistor 7 becomes conductive and, via capacitor 25 and resistor 23, switches ON the other drive transistor 12 and associated power transistor pair 13, 14. During this time in which all four power transistors 13–16 are in non-conductive state, the capacitor 24 will discharge via resistors 10 and 22, so that upon further rotor rotation, the drop in the Hall voltage at output 3 of Hall generator 2 will switch transistor 7 back to its OFF state. This alternating sequence of events is performed repeatedly during rotor rotation, so that current will flow through the stator winding in alternating directions in dependence on the changing angular position of the rotor.

Figure 3:
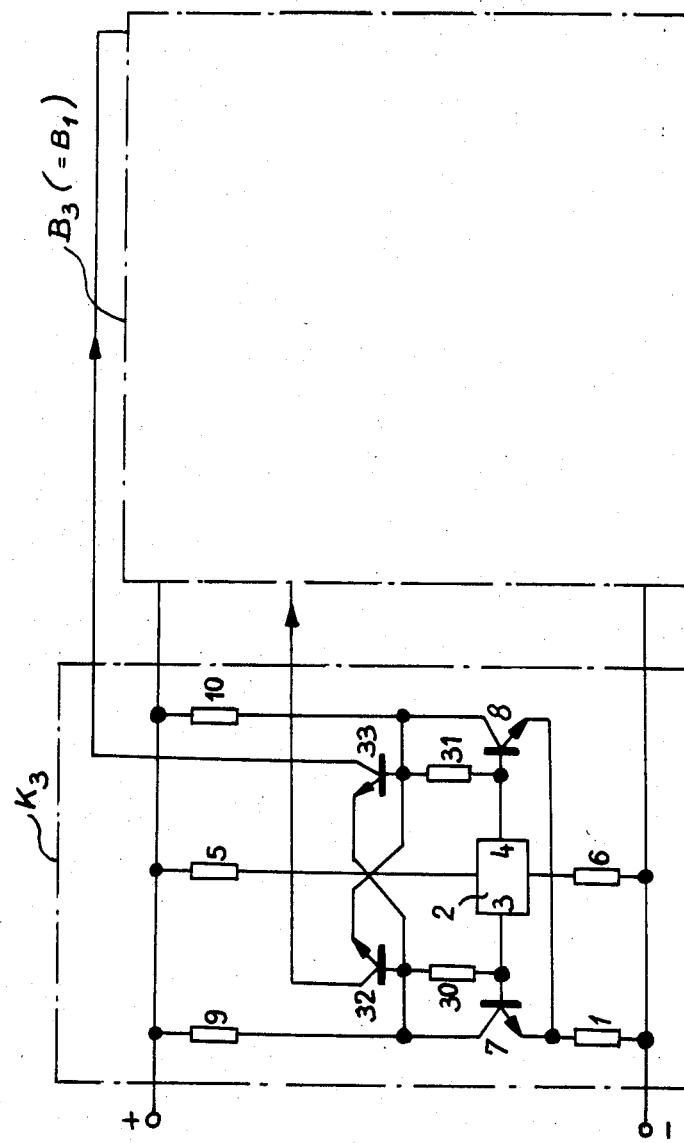
FIG. 3 depicts a commutation circuit provided with means for temperature compensation of the control signals.

In the embodiment of FIG. 3 the temperature dependence of the Hall voltage generated by Hall generator 2 is compensated by feedback resistors 30 and 31, such that the voltages at the bases of the two transistors 32, 33 used in this embodiment will be rendered independent of the ambient temperature to which the Hall generator 2 may be exposed. Namely, the Hall generator's output voltage $U_{Ho}$ will change by about 2%/° K. and its internal resistance $R_{iH}$ will change by about 1.8%/° K.; the internal-resistance change changes the gain of transistor 7 or 8 in such a way that, at high ambient temperature, the lowered Hall voltage will be amplified to a greater degree due to the lowered internal resistance of the Hall generator and the consequently lessened negative feedback; in the opposite case, i.e. low ambient temperature, the temperature compensation of course operates in the same fashion but in the opposite sense.

When the Hall voltages at outputs 3, 4 of Hall generator 2 are about equal, equal voltages are applied to the bases of the transistors 32, 33, so that due to the crosswise connection of the emitters and bases of transistors 32, 33, the latter, and thus the drive transistors 11, 12 and the power transistors 13–16 are all rendered non-conductive.

Assume the Hall voltage at Hall generator output 3 rises to render difference-amplifier transistor 7 conductive, the Hall voltage at output 4 having meanwhile decreased and rendered the other difference-amplifier transistor 8 non-conductive. This rendering-conductive of transistor 7 leads to switching-ON of transistor 32, likewise the drive transistor 12, and the associated power transistor pair 13, 14. Subsequently, after further rotor rotation, the voltage at Hall output 3, applied to the base of difference-amplifier transistor 7, commences to decrease, thereby rendering non-conductive the transistor 32, the drive transistor 12, and the power transistor pair 13, 14. Concurrently with such decrease of the Hall voltage at output 3, the Hall voltage at output 4 is in the process of increasing. Only when the Hall voltage at output 4 has become higher than that at output 3, and higher by a sufficiently great amount, does the transistor 33 become conductive, thereby rendering conductive the driver transistor 11 and the power transistor pair 15, 16. The changes in the Hall voltages at outputs 3 and 4 of Hall generator 2 occur in dependence upon the changes in rotor position during rotor rotation, and are thus time-dependent as well, thus ensuring that both power transistor pairs 13, 14 and 15, 16 are in non-conductive state at the time of commutation. Thus, despite the fact that the two power transistor pairs are rendered conductive alternately, and with a very considerable frequency, it cannot happen that both power transistor pairs be, even briefly, all in their conductive state simultaneously with one another, such as would constitute a short-circuit across the source of operating voltage.

Speed regulation during fluctuations in the operating voltage, and likewise use of the motor with the same circuitry over wide ranges of operating voltage, would of course be possible by using known voltage regulating circuits. However, adaptation to such conditions by such means will generally lead to greater energy losses, which is especially undesirable with battery-operated equipment. Accordingly, various advantageous regulating circuits are described below.

Figure 4:
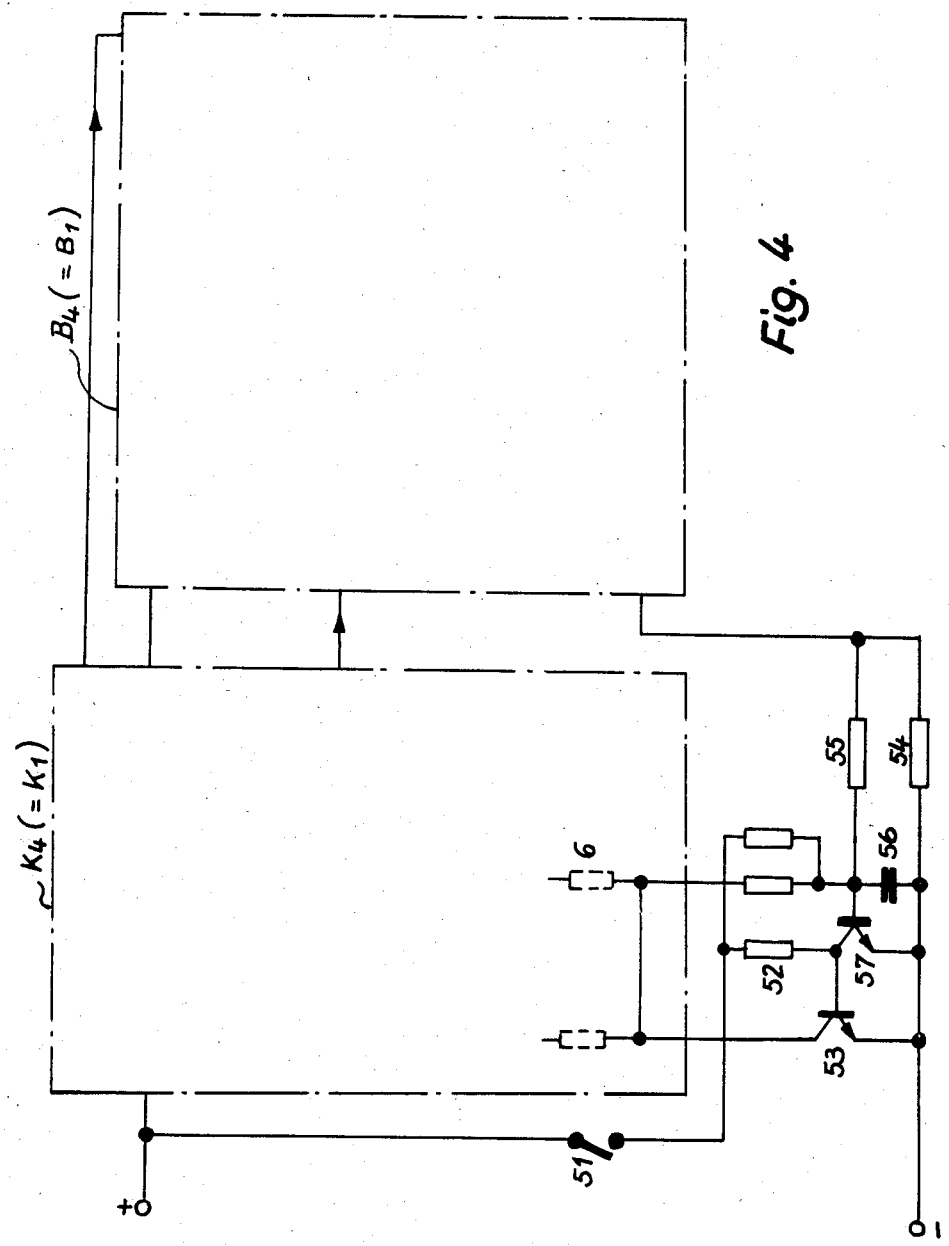
FIG. 4 depicts a commutation circuit as per FIG. 1, but with means for stator-current limitation.

In FIG. 4 closing of switch 51 renders transistor 53 conductive, so that voltage is applied via the resistors 5, 6 to the Hall generator 2, and the power transistor pairs 13, 14 and 15, 16 can be rendered conductive in alternation to each other, in the manner described in FIGS. 1 to 3.

For current-limiting purposes, a low-ohm resistor 54 is arranged in series with the stator winding 1, so that the motor-current-dependent voltage resulting at resistor 54 will charge a capacitor 56. When the voltage at capacitor 56 attains the value necessary to render conductive a transistor 57, this will render transistor 53 non-conductive and thus render non-conductive the difference-amplifier transistors 7, 8, the driver transistors 11, 12, and the power transistors 13, 14 and 15, 16. With all power transistors non-conductive and the stator winding no longer supplying current to the motor-current-measuring resistor, the capacitor 56 commences to discharge via resistors 54 and 55, which ultimately leads to switching-OFF of transistor 57 and switching-ON of transistor 53, and in due course to resumption of current flow in the stator winding 1, depending of course upon the voltages at the outputs 3, 4 of the Hall generator 2. This current flow in the stator winding 1 will charge the capacitor 56 anew, causing the sequence of events just described to be repeated.

The point at which this ON/OFF-type motor-current regulation begins to occur will, in the normal case, lie at the lower limit of the operating voltage range. A rise in the operating voltage will bring about a correspondingly higher frequency of occurrence of the ON/OFF-type regulating action just described. As an advantageous result, the peak value of the motor current is made independent of the magnitude of the operating voltage furnished to the motor's commutation circuitry; but the time of the current rise in the stator winding does remain dependent upon the operating-voltage magnitude. The aforegoing makes it possible for the power consumption in the stator winding 1 to be kept constant within wide limits of variation of the operating voltage's magnitude.

This ON/OFF-type motor-current regulation likewise occurs during motor start-up so that even in the case of high efficiency motors whose stator winding is of small ohmic resistance, the starting current will be maintained equal to the rated-speed current. Thus, the power transistors can be selected solely according to the rated-speed current they must withstand. For motors of higher output power, the power transistors 13, 14 and 15, 16 can if necessary be replaced by Darlington transistors to obtain the required higher power amplification.

Instead of a switch 51, a control member, e.g., a PTC resistor or a photo transistor may be provided, operative for switching the motor on or off in dependence upon temperature or by means of optical signals. In such event the switching current is advantageously small.

Figure 5:
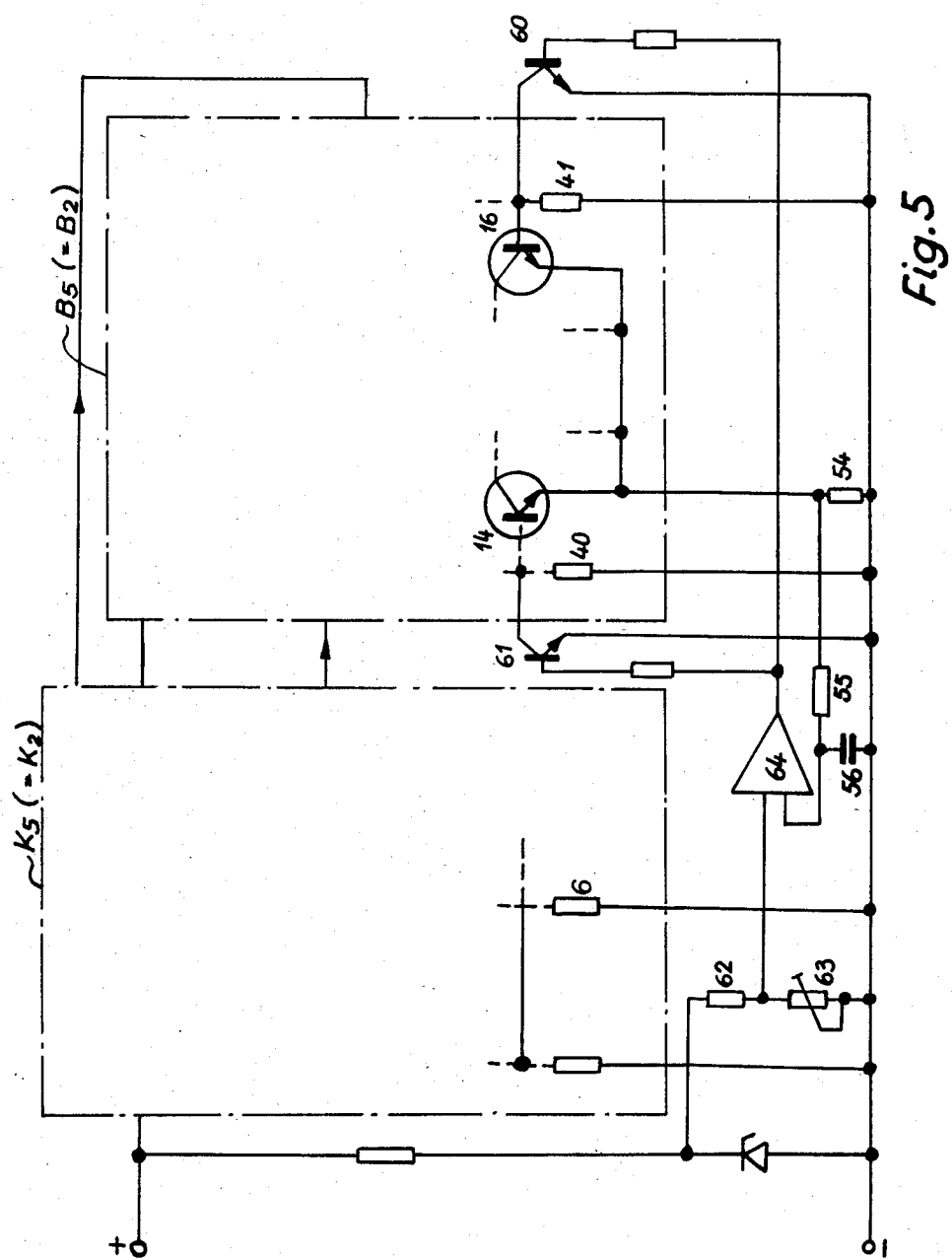
FIG. 5 depicts a commutation circuit as per FIG. 2 but with an adjustable reference voltage for stator-current limitation.

FIG. 5 depicts a regulating circuit in which the signals used to switch OFF the power transistors are directly employed to switch OFF only one respective transistor of the power transistor pair 13, 14 and to switch OFF only one transistor of the transistor pair 15, 16. This one-sided switching-OFF of each bridge arm will cause the stator winding 1, whose stored magnetic energy is endeavoring to transform itself into electric energy, to be short-circuited by the still-conductive power transistor 13 or 15. The voltage that results is, in contrast to the voltage in the FIG. 4 embodiment, of limited magnitude since few resistive components are present within the short circuiting current path, and for short circuit current to flow it is not necessary first to reach the operating voltage. Further advantageous applications of the motor result from this, since with small expenditure as to circuitry, the radio interference voltage can be kept within prescribed limits.

As was the case with the FIG. 4 embodiment, the stator-winding-current-dependent voltage at resistor 54 is employed for current-limiting purposes both during starting and rated speed operation, i.e., this voltage will charge capacitor 56 and cause, via operational amplifier 64, the switching-ON of transistors 60 and 61, namely when the voltage at capacitor 56 exceeds the value of a reference voltage set by a voltage divider 62, 63. Switching-ON of the transistors 60 and 61 will block both transistors 14 and 16, so that the stator winding 1 is no longer connected to the operating voltage, and only the discharge current of capacitor 56 can be measured at the resistors 54 and 55. If the voltage at capacitor 56 drops to the preset value, the transistors 60, 61 are switched OFF via the operational amplifier 64, so that one or the other of the drive transistors 11 and 12 switches ON the associated power transistor pair 13, 14 or 15, 16, causing resumption of current flow through the stator winding 1. The frequency with which the foregoing current-limiting operation occurs depends upon the reference voltage set at the resistor 64, the operating voltage, and upon those components that contribute to determining the time constant of the charging and discharging of capacitor 56.

Figures 6, 7:
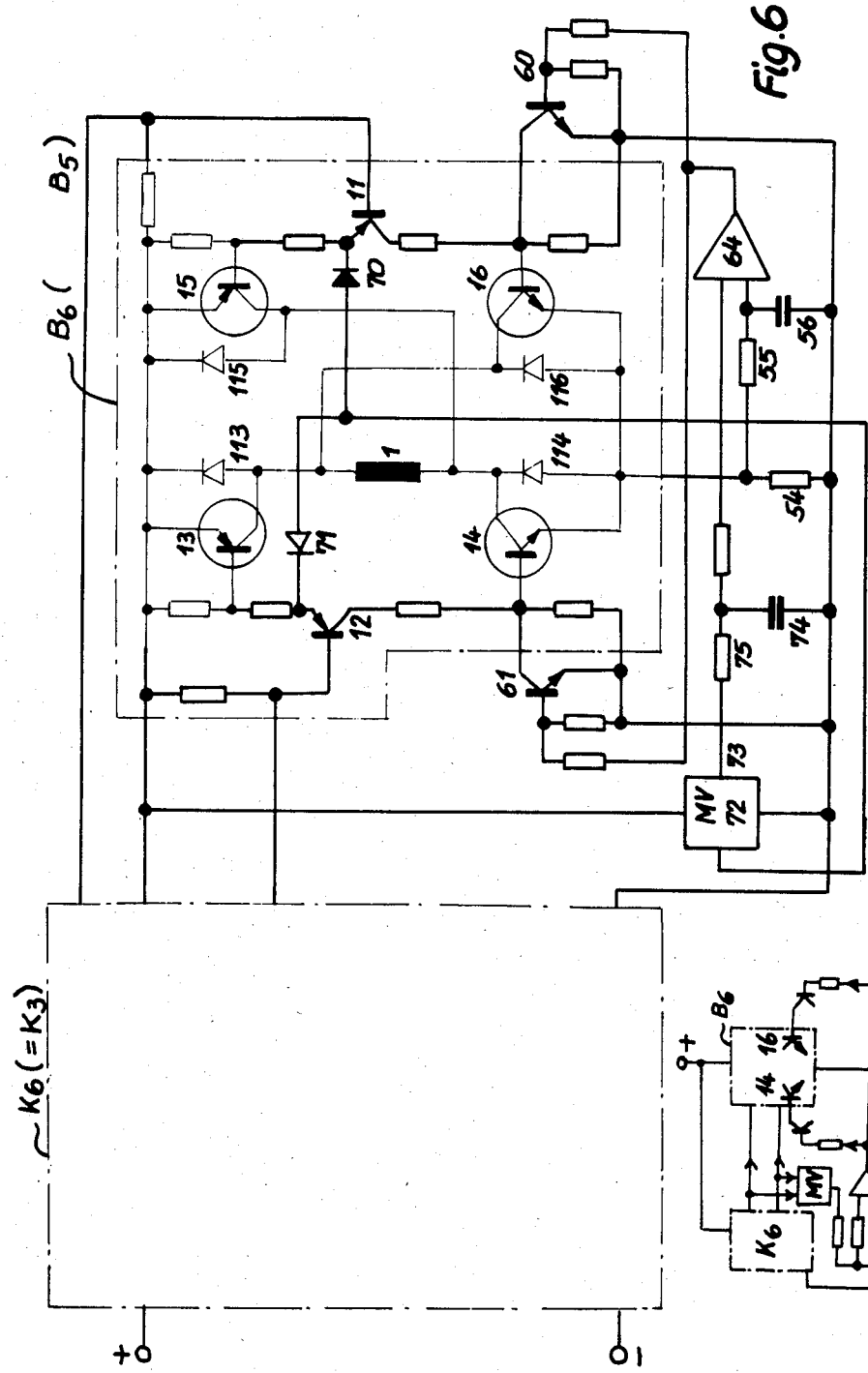
FIG. 6 depicts a commutator circuit as per FIG. 3 but with means for implementing stator-current limitation and also speed regulation.
FIG. 7 depicts the circuit of FIG. 6 in functional or schematic manner.

In addition to the advantages of the FIG. 4 and FIG. 5 embodiments the embodiment of FIGS. 6 and 7 provides not only regulation of stator-winding current but now combined with motor-rpm regulation, this being here achieved using a monostable stage 72. Control signals derived from the drive transistors 11, 12 are led via diodes 70, 71 to the monostable stage 72, which latter is triggered if both drive transistors 11, 12 are in non-conductive state. This will in fact be the case each time a commutation is to occur.

After each such triggering signal, a voltage of constant value is available at output 73 of the monostable stage 72, charging the capacitor 74 via the resistor 75. After a fixed preset time, determined by the desired speed for the motor, the monostable stage 72 will revert to its stable state and the capacitor 74 will discharge until renewed triggering of monostable stage 72, i.e. until the next time that both transistors 11, 12 are in non-conductive state. As long as the voltage at the capacitor 74 is above the value of the voltage at the capacitor 56, the operational amplifier 54 will keep the transistors 60 and 61 non-conductive.

As in FIGS. 4 and 5, the voltage at the capacitor 56 is derived from the voltage at the low-ohm stator-current-measuring resistance 54. If the voltage at the capacitor 56 rises above the value at the capacitor 74, the transistors 60 and 61 are switched ON by the operational amplifier 54 and thus the presently conductive one of the two power transistors 14 and 16 is rendered non-conductive and the current in the stator winding 1 interrupted. As a result, the capacitor 56 will discharge via the resistors 54 and 55, so that after a short time the transistors 60 and 61 will be switched OFF and current flow in the stator winding 1 will resume. The voltage at capacitor 74, serving as reference voltage for speed regulation, is stabilized to a great extent against fluctuations in the operating voltage and changes in the ambient temperature, so that current interruptions in order to limit the current in the stator winding 1, are initiated by a comparison of the voltages at the capacitors 56 and 74.

Since the control voltages for the control of the power transistor pairs 13, 14 and 15, 16 can, according to one's needs or wishes, be obtained in any of the ways taught in FIGS. 1 to 3, and since regulation of current or speed can, likewise according to one's needs or wishes, be implemented in any of the ways taught in FIGS. 4 to 6, it follows that optimal configurations for the control circuit can readily be devised for a variety of different applications. Components that are identical as to their function, bear identical reference numbers to allow a better overview.

Figure 8:
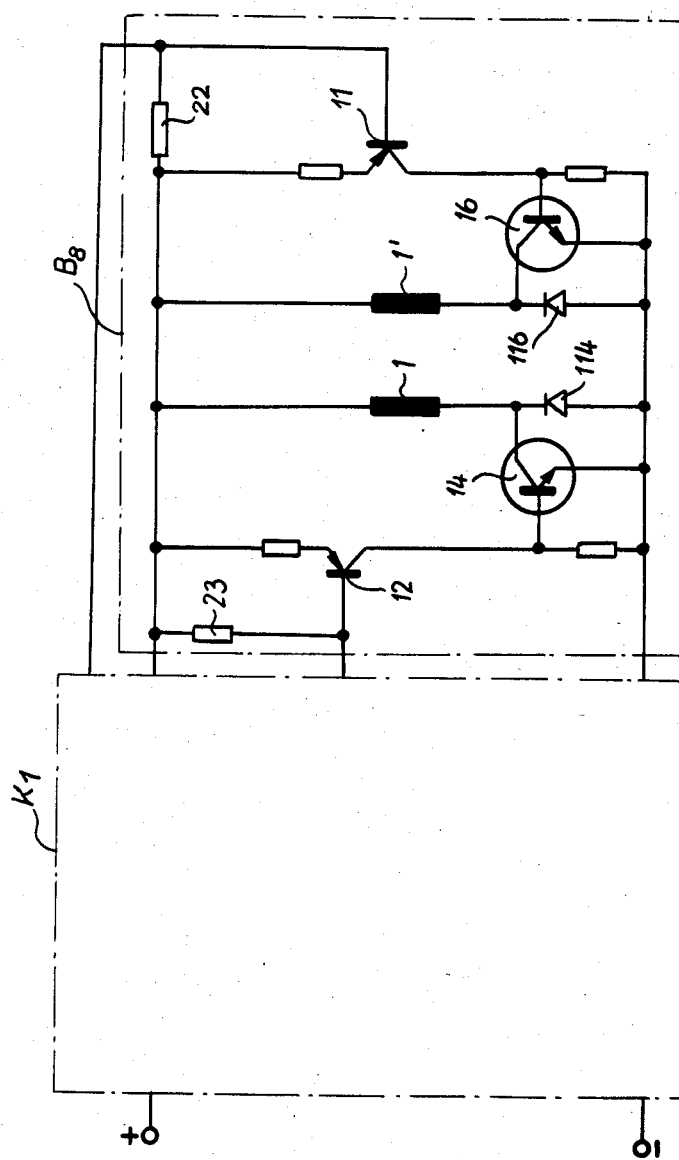
FIG. 8 depicts a modified circuit with the bridge being a composite of semiconductor switches and coils.

In the modified embodiment of FIG. 8, a composite bridge B8 comprising only two power transistors 14, 16 and two stator coils 1, 1' is provided instead of a four-power-transistor full bridge. It will be understood that the composite bridge circuit of FIG. 8 may be combined, if desired, with the commutating circuit K2 and K3 or with circuit stages from any of FIGS. 4, 5 and 6. In the composite bridge circuit of FIG. 8 simultaneous conduction by all (i.e., here, both) power transistors will not cause a short-circuit to be established across the operating-voltage source, in the first place. Nevertheless, simultaneous blocking of both bridge halves at the time of commutation is of advantage here also, especially for good motor efficiency, because this avoids application of current to the motor winding arrangement in the ineffective intermediate zone of the field and wasteful transformation of current into heat.

In the appended claims, especially the broadest of those, the term "energizing circuit means" as applied to the particular embodiments disclosed herein generally refers to all circuit components except the Hall generator 2 itself, and of course excluding the rotor, stator and stator winding; the terms "first winding-current-carrying means" and "second winding-current-carrying means" as applied to the particular embodiments disclosed herein generally refers to the power transistors, as well as to whatever biasing resistors, or the like, the latter may require; the "state control inputs" of the "first and second winding-current-carrying means" are in the exemplary embodiments disclosed herein simply the bases of the power transistors; the "state-determining means" as applied to the particular embodiments disclosed herein generally refers to all circuitry connected between the Hall generator outputs and the bases of the power transistors; and the "threshold-value-establishing means" as applied to the particular embodiments disclosed herein refers generally to all circuitry connected between the difference-amplifier outputs and the bases of the power transistors. However, it will be clearly understood that such terminology, employed in the appended claims, is not meant in any way to limit the scope of the claims to the particular, concrete embodiments disclosed herein nor to the particular, concrete details thereof.

I claim:
1. A one-phase collectorless d.c. motor incapable of producing a rotating stator field and instead producing a stator field which merely alternates between predetermined first and second stator-field orientations which are angularly offset from each other by 180 electrical degrees, the motor comprising
 (a) a permanent-magnet rotor,
 (b) a stator provided with a stator winding,
 (c) stationarily positioned rotor-position-detecting means operative for generating information concerning the angular position of the permanent-magnet rotor, this information including distinguishable first information when the rotor is in a predetermined first range or rotor angular positions, distinguishable second information when the rotor is in a predetermined second range of rotor angular positions, and distinguishable further information when the rotor is in a predetermined range of rotor angular positions that is intermediate said first and second ranges of rotor angular positions,
 (d) energizing circuit means operative, alternately, for effecting a first energization of the stator winding causing the latter to produce a stator field exhibiting said predetermined first stator-field orientation and for effecting a second energization of the stator winding causing the latter to produce a stator field exhibiting said predetermined second stator-field orientation,
 (e) the energizing circuit means including
  (e1) first winding-current-carrying semiconductor means having a conductive state and a non-conductive state and operative when in the conductive state for carrying stator winding current in a predetermined direction which establishes said first stator-field orientation,
  (e2) second winding-current-carrying semiconductor means having a conductive state and a non-conductive state and operative when in the conductive state for carrying stator winding current in a predetermined direction which establishes said second stator-field orientation,
  (e3) said first and second winding-current-carrying semiconductor means having respective state-control inputs,
  (e4) state-determining means connected between the rotor-position-detecting means and the state-control inputs of said first and second winding-current-carrying semiconductor means, said state-determining means being able to distinguish among said first, second and further information generated by said rotor-position-detecting means and determining the conductive and non-conductive states of said first and said second winding-current-carrying semiconductor means in dependence upon the information generated by the rotor-position-detecting means, said state-determining means being operative
   i. for causing said first and second winding-current-carrying semiconductor means to be, respectively, in the conductive and in the non-conductive state thereof in response to said rotor-position-detecting means furnishing said distinguishable first information that is generated when the rotor is in said predetermined first range of rotor angular positions, and ii. for causing said first and second winding-current-carrying semiconductor means to be, respectively, in the non-conductive and in the conductive state thereof in response to said rotor-position-detecting means furnishing said distinguishable second information that is generated when the rotor is in said predetermined second range of rotor angular positions, and iii. for causing both said first and said second winding-current-carrying semiconductor means to be in the non-conductive states thereof, by means of signals applied to said state-control inputs thereof, in response to said rotor-position-detecting means furnishing said distinguishable further information that is generated when the rotor is in said predetermined intermediate range of angular positions.

2. A one-phase collectorless d.c. motor as defined in claim 1,
wherein said rotor-position-detecting means comprises a magnetic-field-sensitive semiconductor element which is responsive to the magnetic field from the permanent-magnet rotor and has a pair of externally accessible outputs which produce respective rotor-position-dependent output signals which vary inversely to each other as a function of changing rotor angular position,
said first information being constituted by the difference between the signals at said pair of outputs having a predetermined first sign and being of at least a predetermined magnitude,
said second information being constituted by the difference between the signals at said pair of outputs having a predetermined opposite second sign and being of at least a predetermined magnitude,
and said further information being constituted by the difference between the signals at said pair of outputs being of less than a predetermined magnitude.

3. A one-phase collectorless d.c. motor as defined in claim 2,
wherein said state-determining means includes a difference amplifier having two inputs each connected to a respective one of said pair of outputs of the magnetic-field-sensitive semiconductor element and furthermore having two outputs connected to the state-control inputs of respective ones of said first and second winding-current-carrying semiconductor means, and operative at least for amplifying the signal level of the said information generated by said rotor-position-detecting means.

4. A one-phase collectorless d.c. motor as defined in claim 3,
wherein said difference amplifier is provided with first feedback means connecting one of the outputs of said difference amplifier to one of the inputs thereof, and second feedback means connecting the other of the outputs of said difference amplifier to the other of the inputs thereof, and operative for providing said magnetic-field-sensitive semiconductor element with compensation against non-magnetic influences,
whereby to compensate against temperature-dependence exhibited by the magnetic-field-sensitive semiconductor element, manufacturing tolerance variations in the operating characteristics exhibited by a particular magnetic-field-sensitive semiconductor element, and the like.

5. A one-phase collectorless d.c. motor as defined in claim 3,
wherein said state-determining means includes threshold-value-establishing means connected to the outputs of said difference amplifier and having two outputs connected to the state-control inputs of respective ones of the first and the second winding-current-carrying semiconductor means, and operative for distinguishing among said first, said second and said further information generated by said rotor-position-detecting means.

6. A one-phase collectorless d.c. motor as defined in claim 5, wherein said threshold-value-establishing means includes a pair of controllable semiconductor elements (32, 33 in FIG. 3) each having an output terminal, these output terminals being connected to the state-control inputs of respective ones of said first and second winding-current-carrying semiconductor means, and operative for distinguishing among said first, said second and said further information generated by said rotor-position-detecting means.

7. A one-phase collectorless d.c. motor as defined in claim 6,
said pair of controllable semiconductor elements of said threshold-value-establishing means being two transistors each having a collector, these collectors being connected to the state-control inputs of respective ones of said first and second winding-current-carrying semiconductor means, each of the two transistors furthermore having a base-emitter junction connected between the two outputs of said difference amplifier, the base of one transistor being connected to one output of said difference amplifier, the base of the other transistor being connected to the other output of said difference amplifier,
the base-emitter threshold voltages of said two transistors serving to distinguish among said first, said second and said further information generated by said rotor-position-detecting means.

8. A one-phase collectorless d.c. motor as defined in claim 1,
wherein said first and said second winding-current-carrying semiconductor means each comprise two winding-current-carrying semiconductor elements of which one feeds current to and the other feeds current away from the stator winding, these four winding-current-carrying semiconductor elements each having a respective state-control input and together with the stator winding being connected together in four-arm-bridge configuration such that said first winding-current-carrying semiconductor means when in conductive state establishes current flow through the stator winding in a first direction, and such that said second winding-current-carrying semiconductor means when in conductive state establishes current flow through said stator winding in the opposite second direction,
and wherein said state-determining means comprises means operative, in response to said distinguishable further information, for causing signals to be applied to the state-control inputs of the aforementioned four winding-current-carrying semiconductor elements such that all four thereof are in their non-conductive state.

9. A one-phase collectorless d.c. motor as defined in claim 8, wherein said state-determining means furthermore includes a respective first and a respective second driver semiconductor element for, respectively, said first and said second winding-current-carrying semiconductor means, each driver semiconductor element having two output terminals each connected to the state-control input of a respective one of the associated pair of winding-current-carrying semiconductor elements.

10. A one-phase collectorless d.c. motor as defined in claim 1, said energizing circuit means including limiting means operative, when a predetermined operating characteristic of the motor exceeds a predetermined safe magnitude, for causing said state-determining means to render both said first and said second winding-current-carrying semiconductor means non-conductive by means of signals applied to the respective state-control inputs of the latter, whereby to limit said operating characteristic to a safe value.

11. A one-phase collectorless d.c. motor as defined in claim 10, wherein said limiting means comprises means operative, when the current drawn by the stator winding exceeds a predetermined safe limit magnitude, for causing said state-determining means to render both said first and said second winding-current-carrying semiconductor means non-conductive by means of signals applied to the respective state-control inputs of the latter, whereby to prevent excessive current draw upon motor start-up or excessive applied load.

12. A one-phase collectorless d.c. motor as defined in claim 1, said energizing circuit means including regulating means operative, when a predetermined operating characteristic of the motor exceeds a preselected magnitude, for causing said state-determining means to render both said first and said second winding-current-carrying semiconductor means non-conductive by means of signals applied to the respective state-control inputs of the latter, whereby to stabilize the average magnitude of said operating characteristic at a desired value.

13. A one-phase collectorless d.c. motor as defined in claim 12, wherein said regulating means comprises current-regulating means operative when the current drawn by the stator winding exceeds a preselected magnitude, for causing said state-determining means to render both said first and said second winding-current-carrying semiconductor means non-conductive by means of signals applied to the respective state-control inputs of the latter, whereby to stabilize the average magnitude of the current drawn by the stator winding at a desired value.

14. A one-phase collectorless d.c. motor as defined in claim 12, wherein said regulating means comprises rpm-regulating means operative, when the motor rpm exceeds a preselected value, for causing said state-determining means to render both said first and said second winding-current-carrying semiconductor means non-conductive by means of signals applied to the respective state-control inputs of the latter, whereby to stabilize the motor rpm at a desired value.

15. A collectorless d.c. motor comprising
(a) a permanent-magnet rotor,
(b) a stator provided with a stator winding, the stator winding comprising at least one stator-winding phase,
(c) stationarily positioned rotor-position-detecting means respectively associated with said at least one stator-winding phase and operative for generating information concerning the angular position of the permanent-magnet rotor, this information including distinguishable first information when the rotor is in a predetermined first range of rotor angular positions, distinguishable second information when the rotor is in a predetermined second range of rotor angular positions, and distinguishable further information when the rotor is in a predetermined range of rotor angular positions which is intermediate said first and second ranges of rotor angular positions,
(d) said rotor-position-detecting means including a magnetic-field-sensitive semiconductor element which is responsive to the magnetic field from the permanent-magnet rotor and has a pair of output terminals which produce respective rotor-position-dependent output signals which vary inversely to each other as a function of the changes of rotor angular position that occur during rotor rotation,
 (d1) said first information being constituted by the difference between the signals at said pair of output terminals having a predetermined first sign and being of at least a predetermined magnitude,
 (d2) said second information being constituted by the difference between the signals at said pair of output terminals having a predetermined opposite second sign and being of at least a predetermined magnitude,
 (d3) and said further information being constituted by the difference between the signals at said pair of output terminals being of less than a predetermined magnitude,
(e) energizing circuit means associated with and connected to said at least one stator-winding phase and operative, alternately, for effecting a first energization of the stator-winding phase causing the latter to produce a stator field exhibiting a predetermined first stator-field orientation and for effecting a second energization of the stator-winding phase causing the latter to produce a stator field exhibiting a predetermined second stator-field orientation offset from said first orientation by 180 electrical degrees,
(f) the energizing circuit means including
 (f1) first winding-current-carrying semiconductor means having a conductive state and a non-conductive state and operative when in the conductive state for carrying stator winding current in a predetermined direction which establishes said first stator-field orientation,
 (f2) second winding-current-carrying semiconductor means having a conductive state and a non-conductive state and operative when in the conductive state for carrying stator winding current in a predetermined direction which establishes said second stator-field orientation,
 (f3) said first and second winding-current-carrying semiconductor means having respective state-control inputs,
 (f4) state-determining means connected between the rotor-position-detecting means and the state-control inputs of said first and said second winding-current-carrying semiconductor means, said state-determining means being able to distinguish among said first, said second and said further information generated by said rotor-position-detecting means and determining the conductive and non-conductive states for said first and said second winding-current-carrying semiconductor means in dependence upon the information generated by the rotor-position-detecting means, said state-determining means being operative i. for causing said first and second winding-current-carrying semiconductor means to be, respectively, in the conductive and in the non-conductive state thereof in response to said rotor-position-detecting means furnishing said distinguishable first information that is generated when the rotor is in said predetermined first range of rotor angular positions, and ii. for causing said first and second winding-current-carrying semiconductor means to be, respectively, in the non-conductive and in the conductive state thereof in response to said rotor-position-detecting means furnishing said distinguishable second information that is generated when the rotor is in said predetermined second range of rotor angular positions, and iii. for causing both said first and said second winding-current-carrying semiconductor means to be in the non-conductive states thereof, by means of signals applied to said state-control inputs thereof, in response to said rotor-position-detecting means furnishing said distinguishable further information that is generated when the rotor is in said predetermined intermediate range of angular positions, (f5) said state-determining means including a difference amplifier having two inputs each connected to a respective one of said pair of output terminals of the magnetic-field-sensitive semiconductor element and furthermore having two outputs connected to the state-control inputs of respective ones of said first and said second winding-current-carrying semiconductor means, and operative at least for amplifying the signal level of the said information generated by said rotor-position-detecting means, (f6) said state-determining means furthermore including threshold-value-establishing means connected to the outputs of said difference amplifier and having two outputs connected to the state-control inputs of respective ones of the first and the second winding-current-carrying semiconductor means, and operative for distinguishing among said first, said second and said further information generated by said rotor-position-detecting means, (f7) said threshold-value-establishing means comprising two transistors each having a collector, these collectors being connected to the state-control inputs of respective ones of said first and second winding-current-carrying semiconductor means, each of the two transistors furthermore having a base-emitter junction connected between the two outputs of said difference amplifier, the base of one transistor being connected to one output of said difference amplifier, and the base of the other transistor being connected to the other output of said difference amplifier, the base-emitter threshold voltages of said two transistors serving to distinguish among said first, said second and said further information generated by said rotor-position-detecting means.

16. A collectorless d.c. motor as defined in claim 15, wherein said difference amplifier is provided with first feedback means connecting one of the outputs of said difference amplifier to one of the inputs thereof, and second feedback means connecting the other of the outputs of said difference amplifier to the other of the inputs thereof, and operative for providing said magnetic-field-sensitive semiconductor element with compensation against non-magnetic influences, whereby to compensate against temperature-dependence exhibited by the magnetic-field-sensitive semiconductor element, manufacturing tolerance variations in the operating characteristics exhibited by a particular magnetic-field-sensitive semiconductor element, and the like.

17. A collectorless d.c. motor comprising a permanent-magnet rotor, a stator provided with a stator winding, the stator winding comprising at least one stator-winding phase, stationarily positioned rotor-position detecting means respectively associated with said at least one stator-winding phase and including a magnetic-field-sensitive semiconductor element which is responsive to the magnetic field from said permanent-magnet rotor and has a pair of output terminals which produce respective rotor-position-dependent output signals which vary inversely to each other as a function of changing rotor angular position during rotor rotation, a difference amplifier having two input terminals each connected to a respective one of said pair of output terminals of said magnetic-field-sensitive semiconductor element and furthermore having two output terminals producing signals which vary inversely to each other, said difference amplifier being provided with first feedback means connecting one of the output terminals of said difference amplifier to one of the input terminals thereof, and second feedback means connecting the other of the output terminals of said difference amplifier to the other of the input terminals thereof, and operative for providing said magnetic-field-sensitive semiconductor element with compensation against non-magnetic influences, whereby to compensate against temperature-dependence exhibited by the magnetic-field-sensitive semiconductor element, manufacturing tolerance variations exhibited by the operating characteristics of a particular magnetic-field-sensitive semiconductor element, and the like, and energizing circuit means respectively associated with and connected to said at least one stator-winding phase and furthermore connected to said two output terminals of said difference amplifier, and operative, alternatively, for energizing said at least one stator-winding phase with a first magnetic polarity and for energizing said at least one stator-winding phase with an opposite second magnetic polarity, depending upon the rotor-position-dependent output signals produced by said magnetic-field-sensitive semiconductor element, and including means operative for deenergizing said at least one stator-winding phase when the rotor-position-dependent output signals generated by said magnetic-field-sensitive semiconductor element indicate that the angular position of the rotor is within a predetermined range of rotor angular positions.

18. A collectorless d.c. motor as defined in claim 17, wherein said means operative for deenergizing said at least one stator-winding phase when the rotor-positiondependent output signals generated by said magnetic-field-sensitive semiconductor element indicate that the angular position of the rotor is within a predetermined range of rotor angular positions, is operative for doing so by determining that the rotor is within such predetermined range of rotor angular positions by receiving the rotor-position-dependent output signals and distinguishing between different values of the latter.

* * * * *